United States Patent
Dirneder et al.

(10) Patent No.: US 9,498,910 B2
(45) Date of Patent: Nov. 22, 2016

(54) INJECTION ASSEMBLY FOR A MOLDING MACHINE

(71) Applicant: ENGEL AUSTRIA GmbH, Schwertberg (AT)

(72) Inventors: Franz Dirneder, Schwertberg (AT); Gottfried Hager, Gallneukirchen (AT); Martin Gusenbauer, Ried in der Riedmark (AT); Hannes Bernhard, Engerwitzdorf (AT)

(73) Assignee: ENGEL AUSTRIA GMBH, Schwertberg (AT)

( * ) Notice: Subject to any disclaimer, the term of this patent is extended or adjusted under 35 U.S.C. 154(b) by 0 days.

(21) Appl. No.: 14/632,263

(22) Filed: Feb. 26, 2015

(65) Prior Publication Data
US 2015/0246472 A1 Sep. 3, 2015

(30) Foreign Application Priority Data
Feb. 28, 2014 (AT) ..................................... 143/2014

(51) Int. Cl.
*B29C 45/50* (2006.01)
*B29C 45/53* (2006.01)
*B29C 45/77* (2006.01)

(52) U.S. Cl.
CPC ......... *B29C 45/531* (2013.01); *B29C 45/5008* (2013.01); *B29C 45/77* (2013.01)

(58) Field of Classification Search
CPC .. B29C 45/5008; B29C 45/531; B29C 45/77
See application file for complete search history.

(56) References Cited

U.S. PATENT DOCUMENTS

| | | | |
|---|---|---|---|
| 3,124,841 A * | 3/1964 | Kaji | B29C 45/5008 222/335 |
| 4,850,851 A | 7/1989 | Dinerman | |
| 5,044,926 A | 9/1991 | Dinerman et al. | |
| 5,164,207 A | 11/1992 | Durina | |
| 5,441,400 A | 8/1995 | Zeiger | |
| 5,980,235 A * | 11/1999 | Eppich | B29C 45/4005 264/334 |
| 6,935,111 B2 * | 8/2005 | Dantlgraber | B29C 45/4005 60/545 |
| 7,086,851 B2 * | 8/2006 | Ickinger | B29C 45/4005 425/556 |
| 7,112,056 B2 * | 9/2006 | Ickinger | B29C 45/4005 425/542 |
| 2004/0037915 A1 | 2/2004 | Dantlgraber | |

FOREIGN PATENT DOCUMENTS

| | | |
|---|---|---|
| DE | 1 201 039 | 9/1965 |
| DE | 25 22 616 | 12/1976 |
| DE | 258 398 | 7/1988 |
| DE | 4008901 | 5/1991 |
| DE | 10121024 | 11/2001 |
| EP | 0 323 556 | 7/1989 |

(Continued)

OTHER PUBLICATIONS

Austrian Office Action (OA) issued Sep. 25, 2014 in Austrian Patent Application No. A 143/2014.

*Primary Examiner* — James Mackey
(74) *Attorney, Agent, or Firm* — Wenderoth, Lind & Ponack, L.L.P.

(57) ABSTRACT

An injection assembly (1) for a molding machine (2), in particular an injection molding machine, comprising an injection piston (3), a drive device (4) for moving the injection piston (3), and a force storage means, wherein the force storage means connects the drive device (4) to the injection piston (3).

14 Claims, 4 Drawing Sheets

(56) References Cited

FOREIGN PATENT DOCUMENTS

Figure 1:
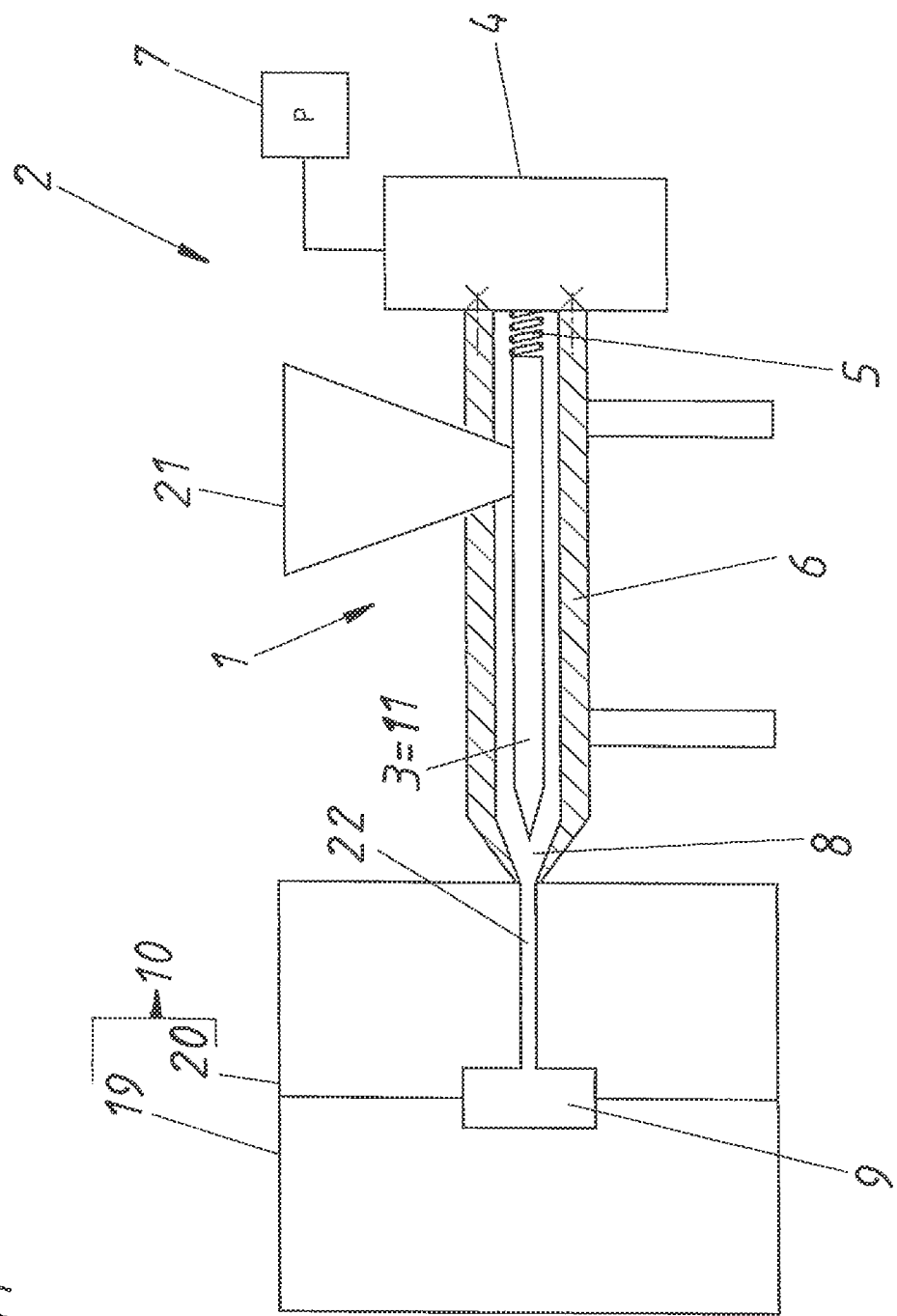

| | | |
|---|---|---|
| EP | 0 541 048 | 5/1993 |
| GB | 1023900 | 10/1964 |
| JP | 4888361 | 10/1973 |
| JP | 61-15123 | 1/1986 |
| JP | 61-68219 A | 4/1986 |
| JP | 61-68219 U | 5/1986 |
| JP | 3-231823 | 10/1991 |
| JP | 2004-58571 | 2/2004 |

* cited by examiner

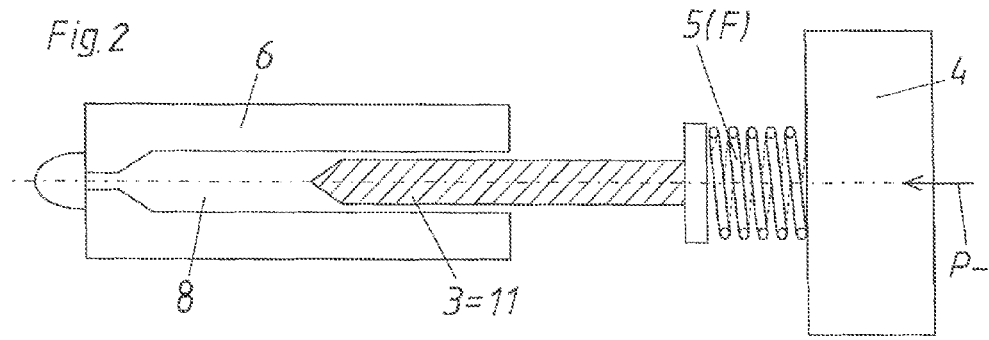
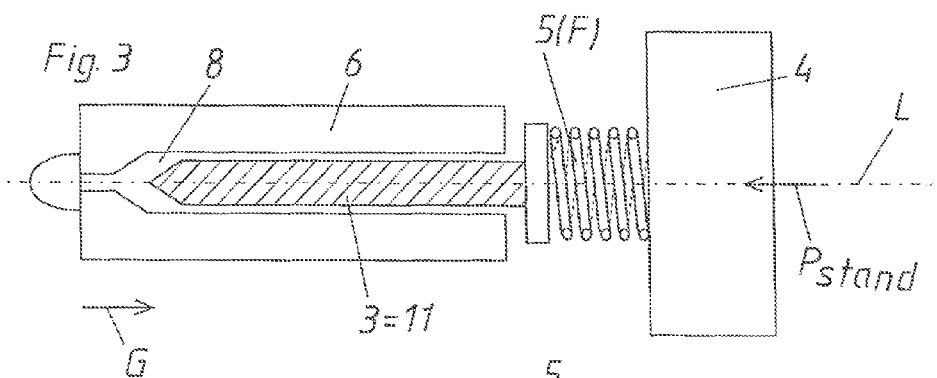
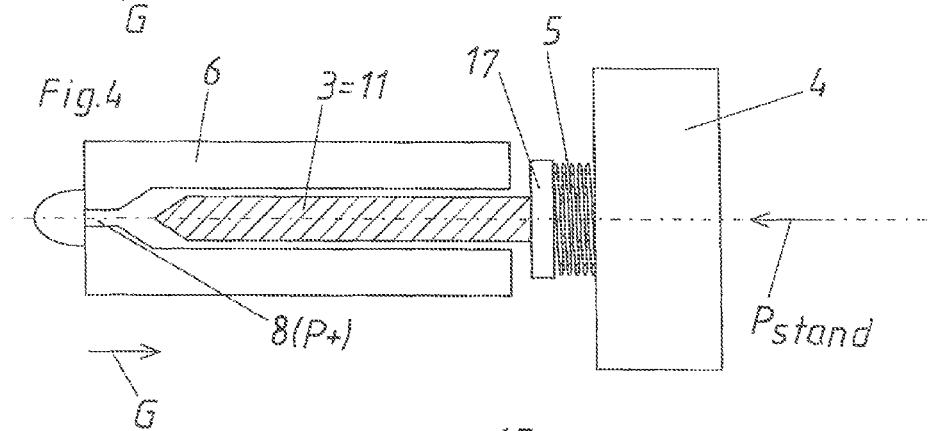
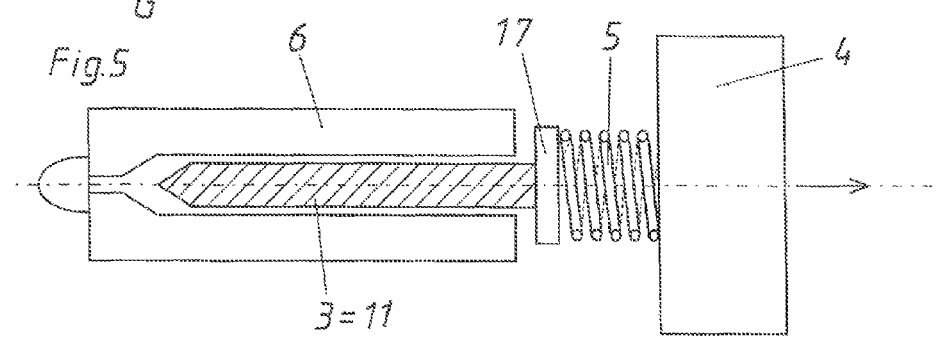

INJECTION ASSEMBLY FOR A MOLDING MACHINE

The invention concerns an injection assembly for a molding machine, in particular an injection molding machine, comprising an injection piston, a drive device for moving the injection piston, and a force storage means. In addition the invention concerns a molding machine comprising at least one such injection assembly.

There have already been many developments in injection assemblies for molding machines for many years. What is particularly important in that respect is that the moldings produced are manufactured with ever increasing accuracy and with ever increasing quality and reproducibility. An essential region which has to be taken into consideration in that respect is the entire injection region or injection passage and in that respect in particular the injection pressure which has a substantial effect on the molding quality. In recent years besides pure plastic material, additive materials like metals, glass fibers and so forth are also increasingly frequently used in molding and injection molding processes. Particularly in the case of metal injection molding and in general with high proportions of additive materials the compressibility of the injected material (molding material) is low or is lower than in the case of pure plastic injection molding. At high injection speeds which are governed by the process involved and with precisely that low level of compressibility of the material to be processed the levels of mass inertia of the drive components involved can lead to relatively long deceleration distances and can thus cause inadmissibly high internal mold pressures. As a result the molding quality is adversely affected and all the components of the injection assembly are (excessively) highly loaded.

In the case of incompressible molding materials (for example plastic materials depending on the respective additive) difficulties can arise in comparison with the molding materials which are usually more greatly compressible (most plastic materials)

Therefore the object of the present invention is to provide an improved injection assembly. In particular the invention seeks to provide that the disadvantages known from the state of the art are overcome. In particular the invention seeks to provide that excessively high internal mold pressures are avoided. The invention seeks to provide that regulatability is improved when dealing with incompressible materials.

That is achieved by an injection assembly having the features described below. In accordance therewith it is provided that the force storage means connects the drive device to the injection piston.

The force storage means on the one hand thus forms a kind of overload protection. In other words, by virtue of the force storage means disposed between the injection piston and the drive device, the axial stiffness of the linearly moved components can be greatly reduced as from a given force level and thus the mechanism is protected from overloading. In other words, the injection piston can axially resiliently deflect as it is connected by way of the force storage means directly to the drive device which is preferably moveable at least with a translatory movement.

It is precisely in the case of incompressible materials that the force storage means on the other hand can be used to provide that yielding capability which is usually found in the case of compressible materials to achieve regulatability thereof.

The state of the art hitherto discloses force storage means or springs in the region of the injection piston only in relation to reverse flow blocking arrangements, with which however an entirely different purpose is performed, namely preventing the back-flow of the injection material into the region between the injection piston and the injection cylinder. Examples of this are to be found in U.S. Pat. No. 5,441,400, DE 1 201 039, DE 25 22 616, EP 0 323 556 A2, EP 0 541 048 A1 and U.S. Pat. No. 5,044,926. All those reverse flow blocking arrangements have force storage means in the form of spring devices in order to block off the reverse flow of the injection material as from a given injection pressure. However those devices cannot prevent an excessively high pressure prevailing in the cavity of a molding tool. Rather, it is precisely at high pressures that those reverse flow blocking arrangements form a fixed or stationary part of the injection piston. In contrast thereto, the present invention provides that the force storage means does not act between the injection piston and the injection cylinder as in the case of a reverse flow blocking arrangement, but directly between the injection piston and the drive device.

In principle the force storage means can be arranged only in the injection piston, that is to say for example it can connect a front part of the injection piston to a rear part of the injection piston (e.g., it is then always still the case that the force storage means connects the front part of the injection piston to the drive device—with the interposition of the rear part—). It is important that the force storage means is a part—which has a damping action—of the drive train (from the drive device to the tip of the injection piston). The force storage means must be at least so arranged that, by means thereof, the piston tip is moveable relative to the drive device and is thus yielding.

As is known per se the injection assembly has an injection cylinder in which the injection piston is mounted at least moveably with a translatory movement. It can also be provided that the injection piston is in the form of an injection screw, in which case the injection screw is drivable by the drive device rotatably and with a translatory movement.

In addition the injection assembly can have a control or regulating unit. That makes in possible in particular for injection material to be injectable by the injection piston into a cavity in a molding tool of the molding machine, at a standard injection pressure which can be established by way of the control or regulating unit. The control or regulating unit can be operated by an operator by way of an operating unit with display screen.

In principle the force storage means can be in the form of rubber-like buffer elements. It can also be in the form of a damping piston or a hydraulic cylinder. It is preferably provided however that the force storage means is in the form of a spring device. In that case the spring device can have at least one rubber spring or at least one pneumatic spring. Preferably the spring device has a compression spring or a pack of compression springs.

It is particularly important with the present invention that the spring device does not adversely affect a "normal" injection process. For that purpose preferably a relatively soft spring device is used and the pressure to be expected in a normal injection process is compensated by a prestressing of the spring device (for example by the use of a spacer sleeve). As a numerical example it can be provided that the spring device is prestressed up to 30% of the possible total deflection. To achieve an adequate long-term load-carrying capacity the spring constant and the extent of the prestressing are to be so selected that the spring device in the loaded situation is not loaded beyond the long-term loading limit. In particular the aim is to provide that the spring device is not compressed to a blocked state. In that connection it is possible to provide a protection device (for example a mechanical abutment) for the spring device, which prevents the spring device being compressed solid in that way. That means that in that case the spring device is so stiff that it forms a fixed non-elastic component of the drive train from the drive device to the tip of the injection piston. The stiffness describes the resistance of a body to elastic deformation due to a force or a torque. That resistance occurs upon injection of the injection material which cannot be further compressed in the closed cavity. In other words the prestressing of the spring device corresponds to the standard injection pressure. That standard injection pressure can be for example at about 2000 bars, but it can be greatly varied depending on the respective purpose of use.

To prevent excessively high cavity or internal mold pressures it is particularly preferably provided that at an increased injection pressure which is above the standard injection pressure the injection piston is moveable relative to the drive device against the stiffness of the spring device and with elastic deformation of the spring device. In other words the drive train movement is damped by the elasticity of the spring device, whereby the internal mold pressure does not become too high.

It is particularly preferably provided that this spring device has a plurality of springs, preferably coil springs, which are preferably arranged regularly around the injection assembly longitudinal axis.

To permit an accurate damping movement and also to avoid inclined positioning of those springs it is preferably provided that the relative movement between the drive device and the injection piston is guided by way of at least one guide element. In that respect it is particularly preferably provided that each guide element is surrounded by a spring of the spring device. In other words, a guide element is passed through each spring.

In relation to the further notion of making more yielding a system which is stiff because of the use of incompressible molding materials it is preferably provided—without using a prestressing—that the spring device is so yielding that this gives the desired yieldingness of the entire system. It is possible to find out how yielding the spring device is to be made, by test or simulations. Thus it is already possible to achieve adaption in respect of movement of the injection piston in the filling phase.

A molding machine, in particular an injection molding machine, can comprise at least one injection assembly according to the invention.

Figure 6:
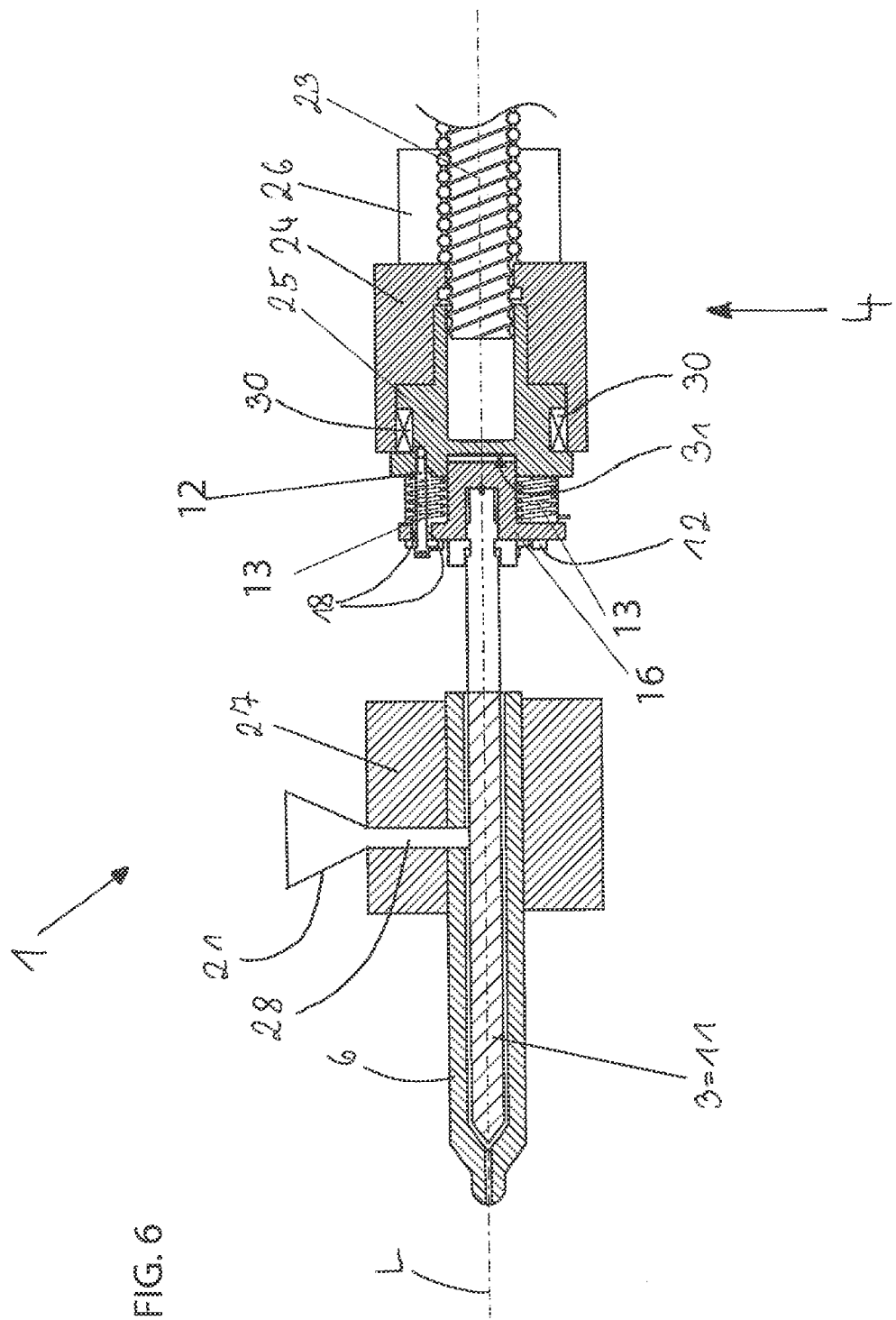
Figure 7:
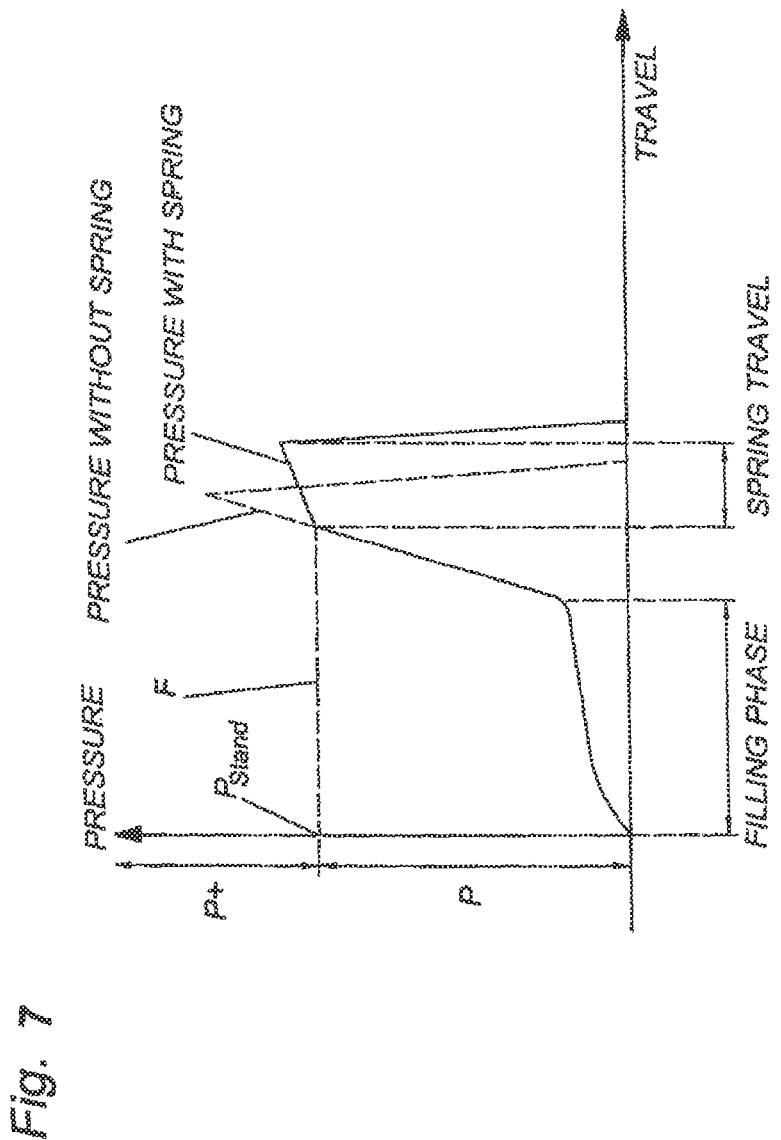

Further advantages and details of the present invention are described more fully by means of the specific description and reference to the embodiments by way of example set forth hereinafter. In the drawing:

FIG. 1 diagrammatically shows a molding machine having an injection assembly and a molding tool, FIGS. 2 through 5 show the injection assembly with the injection piston and the spring device in various positions, FIG. 6 shows details of the connection between the drive device and the injection piston, and FIG. 7 shows a pressure-travel graph with and without the spring device by way of comparison.

FIG. 1 diagrammatically shows a molding machine 2 which as essential components has an injection assembly 1 and a molding tool 10. In addition such a molding machine 2 in the normal case also includes mold mounting plates (not shown) and a toggle lever mechanism. To produce a molding or injection-molded part firstly starting material (for example plastic granular material, metal or ceramic powder, additional fillers like glass fibers, additional fluids or possibly also mixtures thereof) is introduced by way of a filling hopper 21 into an intermediate space between the injection cylinder 6 and the injection piston 3. If the injection piston 3 is in the form of an injection screw 11 the starting material is melted by rotation of the injection screw 11. The rotary movement is passed into the injection screw 11 by the drive device 4. After melting has occurred injection is effected, in which case for that purpose the injection screw 11 is moved piston-like or with a translatory movement by the drive device 4 whereby the molten injection material 8 accumulated in front of the tip of the injection screw 11 is injected into the cavity 9 by way of the injection passage 22. That cavity 9 is provided between the mold halves 19 and 20 of the molding tool 10. The injection process can be controlled manually by an operator. Preferably however it will be noted that the entire injection process can be set by way of an operating unit and a control or regulating unit 7. In particular the standard injection pressure $P_{stand}$ can be set by way of that control or regulating unit 7. In the normal case the set standard injection pressure $P_{stand}$ should correspond to an internal mold pressure which actually obtains in the cavity 9.

It can now happen however that excessively high internal mold pressures are caused by virtue of high injection speeds which are governed by the process involved, and thus long deceleration travels, or by virtue of excessively low compressibility of the material to be processed. To prevent that a force storage means in the form of a spring device 5 is arranged between the injection piston 3 and the drive device 4. The spring device connects the injection piston 3 to the drive device 4. The spring device 5 forms a damper or buffer in order to compensate for excessively high internal mold pressures. The injection piston 3 is thus yieldingly supported. By way of example in that respect attention is directed to the following description of FIGS. 2 through 5.

In FIG. 2 the injection material 8 is already melted in the front region of the injection assembly 1. The injection process begins by the injection screw 11 being moved towards the left by way of the drive device 4. The injection pressure P− which is still low is below the standard injection pressure $P_{stand}$. The standard injection pressure $P_{stand}$ does not have to be an individual specific pressure for example in bars but can also specify as a standard injection pressure range a range at which the pressure rises in normal operation after the filling phase. The spring device 5 is of such a high stiffness F that, at that injection pressure, it forms a fixed immovable part of the drive train.

That is also still the case when, as shown in FIG. 3, the injection screw 11 is in the foremost position and the injection assembly 1 has reached the standard injection pressure $P_{stand}$. In that case the counteracting force G acting on the injection piston 3 by the injection material 8 is still not higher than the stiffness F of the spring device 5.

In general then, starting from that position in FIG. 3, the injection piston 3 can move still further in the direction of the cavity 9, whereby for example a follow-up pressure is exerted. In that case it can happen that excessively high internal mold pressure occurs in the cavity 9, and acts as a counteracting force on the injection piston 3 by way of the injection material 8. Due to that increased injection pressure P+ which is above the standard injection pressure $P_{stand}$ the injection piston 3 is moved relative to the drive device 4 with elastic deformation of the spring device 5 (see FIG. 4). In that way an unwanted overload is actively counteracted by damping of the drive train.

As soon as the internal mold pressure has fallen again or as soon as the movement of the driven mass is stopped the spring device 5 can relax again (see FIG. 5) and again forms a "fixed" or stiff part of the drive train. Thus the spring device 5 has on the one hand a damping action and on the other hand transmits torque.

FIG. 6 shows a more detailed embodiment of an injection assembly 1 with spring device 5. At the injection side the injection piston 3 is moveable relative to the injection cylinder 6. The injection cylinder is connected to a clamping plate 27, wherein the filling opening 28 communicating with the filling hopper 21 passes through both. At the drive side the injection assembly 1 and its drive device 4 have a drive motor (not shown) which directly rotatably drives the spindle 23. Due to that rotary movement of the spindle 23 the spindle nut 26 moves with a translatory movement along the longitudinal axis L of the injection assembly. The first connecting element 24 is rotatably mounted to the spindle nut 26 and the second connecting element 25 is rotatably mounted thereto by way of a bearing 30. Guide elements 12 of a bar-like configuration are in turn fixed to that second connecting element 25. Then the spring device 5 is arranged in the form of a spring pack with a plurality of springs 13, wherein the springs 13 are arranged regularly around the injection assembly longitudinal axis L and bear on the one hand against a drive plate 16 and on the other hand against the second connecting element 25 whereby the drive plate 16 is mounted moveably relative to the second connecting element 25. The contact surface 31 of the second connecting element 25 forms a protection device for the spring device 5 as the movement between the drive plate 16 and the second connecting element 25 is limited by the contact surface 31. A plurality of and preferably ten guide elements 12 of a bar-shaped configuration are fixed in the second connecting element 25. On the end remote from the second connecting element 25 those guide elements 12 are moveably guided in openings 18 in the drive plate 16. A respective spring 13 of the spring device 5 is arranged around each of the guide elements 12. It will be appreciated that unlike the illustrated structure it would also be possible to provide a concentrically arranged spring device 5 (see for example FIG. 2). At the same time the drive plate 16 forms a kind of clamping sleeve with which the springs 13 are prestressed. That is to say the guide elements 12 are at the same time screw elements which can be screwed to the second connecting element 25 and by way of which the drive plate 16 is connected to the second connecting element 25. The drive plate 16 is longitudinally displaceable relative to the screw elements or the guide elements 12. The further those screw elements are screwed into the second connecting element 25 the correspondingly greater is the prestressing of the springs 13 and thus the permissible standard injection pressure $P_{stand}$. This design configuration guarantees stable force transmission in the drive train in the case of translatory movement, in the case of rotary movement and in the case of damping by way of the spring device 5.

FIG. 7 shows a graph illustrating by comparison an injection assembly 1 without spring device 5 and an injection assembly 1 with spring device 5. The horizontal axis shows the travel distance that an injection piston 3 or the drive bar 15 covers during the injection operation. The vertical axis shows the injection pressure P and P+ respectively which prevails in the cavity 9 and in the injection passage 22 respectively during the injection operation. At the beginning of the injection operation—therefore during the filling phase—the injection piston 3 moves continuously forwardly, the injection pressure P rising only slightly during that filling phase. As soon as the cavity 9 is filled the injection pressure P rises greatly by virtue of the further movement of the injection piston 3 until the standard injection pressure $P_{stand}$ is reached. If no spring device 5 is arranged between the injection piston 3 and the drive device 4 an unwantedly high injection pressure P+ can be reached (see the broken-line pressure peak). If however a force storage means according to the invention (spring device 5) is used that pressure peak is averted and the forward movement actually performed by the drive device 4 is not entirely transmitted to the injection piston 3 but a relative movement between the drive device 4 and the injection piston 3 is produced corresponding to the spring travel. In that case the standard injection pressure $P_{stand}$ substantially corresponds to the prestressing or stiffness F of the spring device 5.

The invention claimed is:

1. An injection assembly for a molding machine, comprising:
    an injection piston;
    a drive device for moving the injection piston; and
    a force storage means,
    wherein
    the force storage means comprises a spring device, and connects the drive device to the injection piston,
    the molding machine includes a molding tool, and injection material is injected by the injection piston into a cavity of the molding tool of the molding machine at a first injection pressure which is set by a control or regulating unit,
    the spring device is of a stiffness which substantially corresponds to a counteracting force acting on the injection piston at the first injection pressure of the injection material, and
    at an increased injection pressure which is above the first injection pressure, the injection piston is moveable relative to the drive device against the stiffness of the spring device and with elastic deformation of the spring device.

2. An injection assembly as set forth in claim 1, wherein the injection assembly includes an injection cylinder in which the injection piston is moveable with a translatory movement.

3. An injection assembly as set forth in claim 1, wherein the spring device is prestressed.

4. An injection assembly as set forth in claim 3, wherein the spring device is prestressed to between 20% and 40% of the possible total deflection of the spring device.

5. An injection assembly as set forth in claim 1, wherein the spring device is not prestressed, such that the stiffness of the spring device is not based on prestressing of the spring device.

6. An injection assembly as set forth in claim 1, wherein the injection piston comprises an injection screw, and the injection screw is drivable by the drive device rotatably and with a translatory movement.

7. An injection assembly as set forth in claim 1, wherein the relative movement between the drive device and the injection piston is guided by at least one guide element.

8. An injection assembly as set forth in claim 1, wherein the spring device includes a plurality of springs which are arranged regularly around the injection assembly longitudinal axis.

9. An injection assembly as set forth in claim 7, wherein the spring device includes a spring, and the at least one guide element is surrounded by the spring of the spring device.

10. An injection assembly as set forth in claim 1, wherein the molding machine is an injection molding machine.

11. An injection assembly as set forth in claim 4, wherein the spring device is prestressed to 30% of the possible total deflection of the spring device.

12. An injection assembly as set forth in claim 8, wherein the springs of the plurality of springs are coil springs.

13. A molding machine, comprising at least one injection assembly as set forth in claim 1.

14. A molding machine as set forth in claim 13, wherein the molding machine is an injection molding machine.

\* \* \* \* \*